US008418258B2

(12) United States Patent
Goyal et al.

(10) Patent No.: US 8,418,258 B2
(45) Date of Patent: Apr. 9, 2013

(54) SYSTEM FOR PROVIDING MOBILE DATA SECURITY

(75) Inventors: Arvind Goyal, Sudbury, MA (US); Joseph George, Boston, MA (US); Howard Mak, Ashland, MA (US); John E. Arnold, Westborough, MA (US)

(73) Assignee: Antenna Vaultus, Inc., Jersey City, NJ (US)

( * ) Notice: Subject to any disclaimer, the term of this patent is extended or adjusted under 35 U.S.C. 154(b) by 88 days.

(21) Appl. No.: 12/888,991

(22) Filed: Sep. 23, 2010

(65) Prior Publication Data

US 2011/0107437 A1    May 5, 2011

(51) Int. Cl.
*G06F 15/16* (2006.01)
*G06F 21/24* (2006.01)

(52) U.S. Cl. ............................... 726/30; 726/3; 709/217

(58) Field of Classification Search ................. 726/3, 30; 709/217
See application file for complete search history.

(56) References Cited

U.S. PATENT DOCUMENTS

| 6,604,236 | B1 * | 8/2003 | Draper et al. ................. 717/170 |
| 7,287,068 | B1 * | 10/2007 | Eriksson et al. .............. 709/221 |
| 7,299,288 | B2 * | 11/2007 | Chang et al. .................. 709/229 |
| 7,627,634 | B2 * | 12/2009 | Hein .............................. 709/206 |
| 7,702,590 | B2 * | 4/2010 | Malik .............................. 705/59 |
| 7,917,963 | B2 * | 3/2011 | Goyal et al. ..................... 726/29 |
| 2002/0184347 | A1 * | 12/2002 | Olson et al. ..................... 709/220 |
| 2004/0047302 | A1 * | 3/2004 | Dezonno et al. ............. 370/270 |
| 2004/0172427 | A1 * | 9/2004 | Thomas et al. ............... 707/204 |
| 2005/0086192 | A1 * | 4/2005 | Kodama ............................. 707/1 |
| 2006/0242157 | A1 * | 10/2006 | McCuller ........................ 707/10 |
| 2006/0253501 | A1 * | 11/2006 | Langan et al. ................ 707/201 |
| 2007/0192329 | A1 * | 8/2007 | Croft et al. ...................... 707/10 |
| 2007/0245409 | A1 * | 10/2007 | Harris et al. ...................... 726/5 |

* cited by examiner

*Primary Examiner* — Kambiz Zand
*Assistant Examiner* — Aubrey Wyszynski
(74) *Attorney, Agent, or Firm* — Paul J. Sutton; Barry G. Magidoff

(57) ABSTRACT

A system transfers applications and datasets (files) from a server to a client device and assigns to each file a lease key that will expire at a specified time. A file cannot be accessed unless its lease key is validated. Upon expiration of a lease key, the client device will connect to the server to determine if the lease key may be renewed. If the lease key may be renewed, a new lease key is created and access to the associated application or dataset is restored. If the lease key may not be renewed, the file may be deleted or rendered inaccessible. If rendered inaccessible, the file may be restored in the future without having to re-transmit it from the server to the client device. The server may also revoke a lease key before it expires.

16 Claims, 12 Drawing Sheets

SYSTEM FOR PROVIDING MOBILE DATA SECURITY

CROSS REFERENCE TO RELATED APPLICATION

This application is a Continuation of U.S. application Ser. No. 11/836,561, filed Aug. 9, 2007, which claims the benefit of U.S. Provisional Application No. 60/821,886, filed Aug. 9, 2006, the entire disclosure of which is incorporated herein by reference.

FIELD OF THE INVENTION

The present invention relates primarily to providing security for data stored on mobile client devices.

BACKGROUND OF THE INVENTION

The need for mobile data security has been widely recognized. Access to data on electronic devices has tracked the capabilities of the devices on which the data could be rendered in a format that people could access. In early data processing systems, the data was resident on the source computer (typically a mainframe or minicomputer) and displayed on an external device such as a 'dumb terminal.' The display of data was ephemeral in the sense that the dumb terminal had no local storage and was strictly a display device. All actions (reading, writing, or modifying data) on the device were manipulating data on an external device. Also, the data no longer existed on the device once it was turned off. Therefore, the data was as secure as the backend mainframe computer, and there was no need for extra measures to be taken to provide data security on the external device.

As the personal computer era began, external devices became more capable, and the provision for local storage allowed some data storage on the external, connected device. At this point, data could be transformed on the backend device into files or datasets and transferred to the external device where they could be stored, viewed, and manipulated on the external device. With the advent of data being stored on the external device, the security of the data on the external device became a concern—especially when the data was sensitive and not intended for general viewing.

The need to secure data exported to an external device led to the development of a number of security mechanisms. Each security mechanism addresses one or more particular weaknesses that can be exploited in order for an unauthorized user to be able to access the data. Physical security of the external device has played a key role. Other approaches have used the capabilities of operating systems or file systems (e.g., password controlled login to access device capabilities, the use of access control lists (ACLs) to determine which user(s) can have access to data on the device) to limit the ability to open a file to users who have been properly authenticated. Still other approaches prevent data that is authorized to be on one computer from being moved to another computer.

The move toward web access via web browsers and thin clients can be viewed as a move back toward the traditional data access without local storage. However, performance considerations have led to implementing these approaches such that the devices use a local cache of data that remains resident on the browser-based or thin client device. In these scenarios, security may be improved if care is be taken to store cached data files in an area of local storage that is accessible only to authorized users, or if data in the local cache is deleted upon user logout, or if similar procedures are adopted. It must be recognized, however, that data does exist on the external device for some period of time while the user is accessing a browser-based or thin client system. Therefore, it is important to realize that the security of data on these devices with limited local storage remains an important issue. Though the data on these devices may be in a different format (e.g., file type) and somewhat more ephemeral than a desktop computer, the data on the device must still be secured as 'on device' data until it is deleted from the external device.

It should be noted that mobile devices (such as Research In Motion's BlackBerry devices, personal digital assistants (PDAs) such as PalmOS and PocketPC devices, and cell phones with BlackBerry or PDA capabilities) were originally treated as devices with limited local device storage. However, as these devices evolve to contain more storage, more processing power, and better displays, they are becoming more like un-tethered versions of more powerful devices such as laptop computers. Also, as with laptop computers, reliance on physical security of the device as a front line of security for data on the device is less effective as the devices frequently move in and out of physically secure environments.

As reliance on physical security has diminished, other security mechanisms have evolved to address the issue of data security on external devices. Since many external devices have access to the internet, security mechanisms have been developed to take advantage of this capability. The best example of this newer kind of data security is seen in security measures that may be taken for devices that typically are 'always on.' For example, cell phones can be deactivated remotely by the cell phone carrier if they are reported lost or stolen. Even when the phone is turned off, the phone aspect of the device can be defeated by making the backend infrastructure disallow the use of the phone when it is turned back on or re-enters the carrier's network coverage area.

It is recognized, however, that defeating one particular feature of a device (e.g., the ability to place a call on a cell phone or Smartphone) does not provide security for data on the device. Therefore, more aggressive measures have been developed to secure data on networked external devices. The most widely recognized example of this capability is the 'kill device' capability of the BlackBerry Enterprise Server (BES—from Research in Motion). The 'kill device' capability allows the BlackBerry infrastructure administrator to indicate that a given device should be rendered unusable. The infrastructure software then looks for the device on the network. If it is found, a command is sent to the machine that deletes the data on the machine and disables some of the device's capabilities. If the device is not found on the network, the support software remains vigilant for the next time the device connects to the network. When that activity is detected, the 'kill device' command is sent, and the device's attempted connection fails (after the 'kill device' command has performed its duties).

This capability performs more thorough security than merely disabling the phone or one of its features. By deleting the information on the device when the 'kill device' command is executed, the time during which any data on the device may be accessible by potentially unauthorized users is minimized. This security mechanism has worked well for devices that are intended to be 'always on'. However, for devices that can be intentionally taken off the network (e.g., BlackBerry, laptops, etc.), there is always the chance that the device was 'off network' when it was lost or stolen. This would leave a 'kill device' command partially ineffective since the data could be copied from the device before it is put 'on network' where it could receive the 'kill device' command.

As indicated above, the proliferation of mobile information devices has broadened the scope of data and information security. Security concerns focusing on the security of corporate servers and access to those servers remain a key component of any prudent security effort. However, corporate security officers must concern themselves with the protection of the data they provide for the complete lifespan of the data. The focus has broadened from security of the data on its server 'home' to security of the data wherever it is—including mobile devices such as PDAs (including BlackBerry, PalmOS, and Pocket PC devices) and mobile phones.

With data security needing to address the complete data 'lifespan', corporate security officers need to define the data lifespan so they understand it, measure it, and—with the proper tools—control it. Determining the data lifespan on a corporate server behind a firewall is relatively easy. Data exists from the time it is placed on the server until it is removed from the server. Of course, the data may continue to exist on backup tapes and other offline archives for corporate or regulatory purposes, however, the security of these archives is primarily physical security that is well understood. Data security on servers includes efforts to protect the physical and network access to the data. Since this aspect of data security is well understood, data is often allowed to exist on the server for extended periods of time. Controlling the data lifespan on a server has been the primary focus of data security efforts to date.

In terms of mobile data security, however, this server-centric point of view has led to a focus on access and authentication measures. These measures are designed to restrict unauthorized users from accessing the data. Application software also uses access controls to restrict authorized users to specific subsets of the data that reside on the server. Once a user is authenticated and granted access to the data, the data is typically transmitted to the device in some format. The formats range from simple (e.g., viewing a web page that displays the data) to complex (e.g., a dataset represented as an XML document or Excel spreadsheet).

Transmitting data to an external device creates a new instance of the data with a lifespan that is independent of the source data on the server. Mechanisms such as TCP/IP packet encryption have been designed and deployed to prevent data from being intercepted while in transit to an external device. However, once data has been transmitted to an external device, the data leaves the reach and protection of most legacy data security and protection schemes. In almost all cases, keeping data secure relies on trust in external mechanisms (e.g., the browser cache being cleared at some future point) or trust in the users themselves to protect the data and delete it at some point.

Originally, delegating responsibility for data security to the user or to an independent mechanism on the local device was viewed as sufficient. This delegation was acceptable since the data transmission was typically made to a desktop machine where the physical security of the system could mitigate some of the risk. The emergence of laptop computers, however, lessened the degree to which it was acceptable to delegate data security to the user and the local device's native mechanisms. As devices have become smaller and more powerful, the risks of loss and/or theft of the device or of data on the device have reached the point where corporate security officers need the ability to directly manage and control the security and protection of data that has been transmitted to mobile devices.

Some recent approaches to data security and protection have taken a more active role. These approaches recognize the need to take some responsibility for data security even after the data has been handed off to a mobile device. Given the dynamic nature of data accessibility, any user's permission to access certain information is subject to change. Even after an initial permission is granted, situations may dictate that this permission be revoked for reasons such as change of employment status, re-categorization of data sensitivity, or data deemed incorrect that would require a data refresh (while making the 'bad' data unusable). The need to revoke data that is considered ephemeral may be perceived as not needing this kind of revocation (e.g., web-based data access) even though it can be more persistent than data providers may realize, given the ability to save web pages, scrape data, etc. However, there is a distinct need to be able to revoke data access for data that is explicitly delivered for persistent storage on a mobile device. The ability to revoke access to data on a device that may or may not be on the network requires a multi-faceted approach, since it cannot be assumed the data can be revoked on demand.

One current approach permits the data provider to send a 'delete' directive to a specific mobile device. For example, Research In Motion's BlackBerry Enterprise Server (BES) or Microsoft's Exchange 2003 server with SP2 implements a mechanism that allows a server administrator to send a command to the mobile device that directs it to delete or render inaccessible specific data on the device (e.g., contact list and email messages). This can be useful in situations in which a mobile device owner reports a lost or stolen device, as discussed above, or when an employer reports a device that was not returned by a former employee. This approach can be effective. However, it has shortcomings that make it less-than-desirable:

Need to be on the network to receive the 'delete' command. Pushing a delete command to a mobile device is reminiscent of the cell phone heritage of many of today's mobile devices. Since a cell phone must be on the network to be used, and the primary concern of the owner of a lost cell phone was the cost associated with the unauthorized use of the lost cell phone, it was an acceptable practice to render the device useless once it was detected on the network (and thus able to be used). However, the ability to take a device offline leaves all of the unencrypted data on the device exposed to offline recovery attempts. On many popular devices, this means that names, phone numbers, and corporate data can be obtained by anyone who possesses the device. As devices began to incorporate easy mechanisms to take the device offline (e.g., BlackBerry devices readily allow this to allow their use as a PDA in communications-constrained environments like airplanes), the security of data on the device has lessened.

Need to re-populate data after the device is lost or recovered. Mobile devices with data connections have historically had markedly lower bandwidth access to networks than their wired counterparts. Thus, the choice to delete the information from a device when protecting a lost or misplaced device requires any deleted data to be re-sent to the device if the device is found and needs to be re-activated. Though this is a minor inconvenience compared to losing the data/device completely, and this action can be mitigated somewhat using a docking station that is wired to a desktop computer, the problem of having to re-populate datasets on remote devices will not be diminished as the storage capacity and capabilities of mobile devices continue to grow. Bandwidth constraints on the transmission of data to mobile devices via telecom networks are a major concern when considering the need to re-populate a device's data.

As all data provisioning becomes viewed as potentially providing data to a mobile device, this topic indicates the need to integrate data security with data delivery whenever and wherever data is provided for later storage and use by the user. This antiquates the idea that some data is mobile and some isn't. With today's smaller removable storage (USB drives, Secure Digital cards, etc.), it is prudent to consider that all data may become mobile data and needs to be secured accordingly. The present invention embodies improvements that can be made to mobile data security to provide capabilities beyond those currently available in the art. The present invention can both (a) protect application data when the device is offline and (b) re-activate application data without needing to re-populate it from the server.

SUMMARY OF THE INVENTION

The novel invention as set out below is a system that secures and protects data on a mobile device, even when the device is offline. The present invention securely transmits applications and datasets from a server to a client device, along with the necessary tools for the client device to create a 'lease key' for each application or dataset. Each lease key is programmed to expire after a certain amount of time, or at a specified date and time, as set out by a system administrator in the data that is transmitted to the client device from the server. When a user attempts to access an application or dataset on their mobile device, the invention checks to ensure that a valid lease key exists on the client device for the application or dataset before allowing the device to access it. Once the existence of a valid lease key for that user/device/application/dataset combination is verified, access to the application or dataset is granted.

A lease key expires when its programmed time runs out, or when the specified date and time has arrived. The invention may be programmed to attempt an automatic renewal of the lease key upon expiration to minimize interruptions to the user. Additionally, the invention may be programmed such that the lease keys are checked for renewal any time a user logs into the system.

Upon expiration of a lease key, its associated application or dataset may not be accessed until the lease key is renewed by the server. Since the lease key is stored on the client device, it can expire at any time, thus rendering the associated application or dataset inaccessible, even when not connected to the network.

Expiration of a lease key may either delete the associated application or dataset, or render it inaccessible by making it 'invisible,' or by further encrypting it. Later re-authentication of the lease key with the backend server can result in the generation of a new lease key on the device. This new lease key can then make the data visible immediately without having to wait for the application or dataset to be re-transmitted from the server to the mobile device, resulting in both time and bandwidth savings.

Thus, the present invention provides improved mobile data security protection for applications and datasets on a mobile device, even while the device is 'offline', or is otherwise not connected to a network.

BRIEF DESCRIPTION OF THE DRAWINGS

The invention is illustrated by way of example, and not by way of limitation in the figures of the accompanying drawings, in which.

DETAILED DESCRIPTION OF THE INVENTION

The present invention solves the shortcomings of existing mobile data security systems by generating a 'lease key' for the application data. The 'lease key' is used to secure the application data throughout its lifespan on the client device. The primary components of the present invention are a server, a client, and connection.

The server is a device to which one or more client devices may be connected in order to access applications and data that are provided to the client. The term 'server' refers to the hardware, operating system, and application software on the device. Although 'server' is used as a general term, there are different types of servers present in the architecture. Examples include without limitation, a data server, an application/dataset manager server, a web server. It is possible that a single hardware server can host the role of multiple 'servers' as discussed in this description. (For example, a single hardware server can host a data server and web server.)

The client is a mobile device such as a laptop computer, handheld device (e.g., BlackBerry, Palm, or PocketPC PDA), or mobile telephone (e.g., Smartphone) with the capability and capacity for connecting to a server. In the described usage, the client will typically connect to a server to download application(s) and data to the device for remote usage. The term 'client' refers to the hardware, operating system, and application software on the device.

In an alternate embodiment of the invention, the client may be a desktop computer.

'Connection' refers to a communications link that is established between a client and a server. This is typically provided via an established mechanism such as a TCP/IP network connection or a connection via a docking station. Depending on the circumstances, the connection can be a wired connection or a wireless connection (using an existing protocol such as 802.11, Bluetooth, or a data network layered on a cell phone network).

The present invention is described below in terms of two related aspects of the server and client infrastructure: (a) the deployment and maintenance of applications and datasets on the client and (b) the use of those applications and datasets once they are on the mobile client. Each aspect runs independently and is not a serial process. For example, the set of applications or datasets that a particular user or device is authorized to access can change independently of the user accessing the application(s) or dataset(s) on the client device. Therefore, the two aspects are best viewed as two independent systems that are loosely (and asynchronously) coupled via the 'connection processor' that connects the server and client components.

Figure 1:
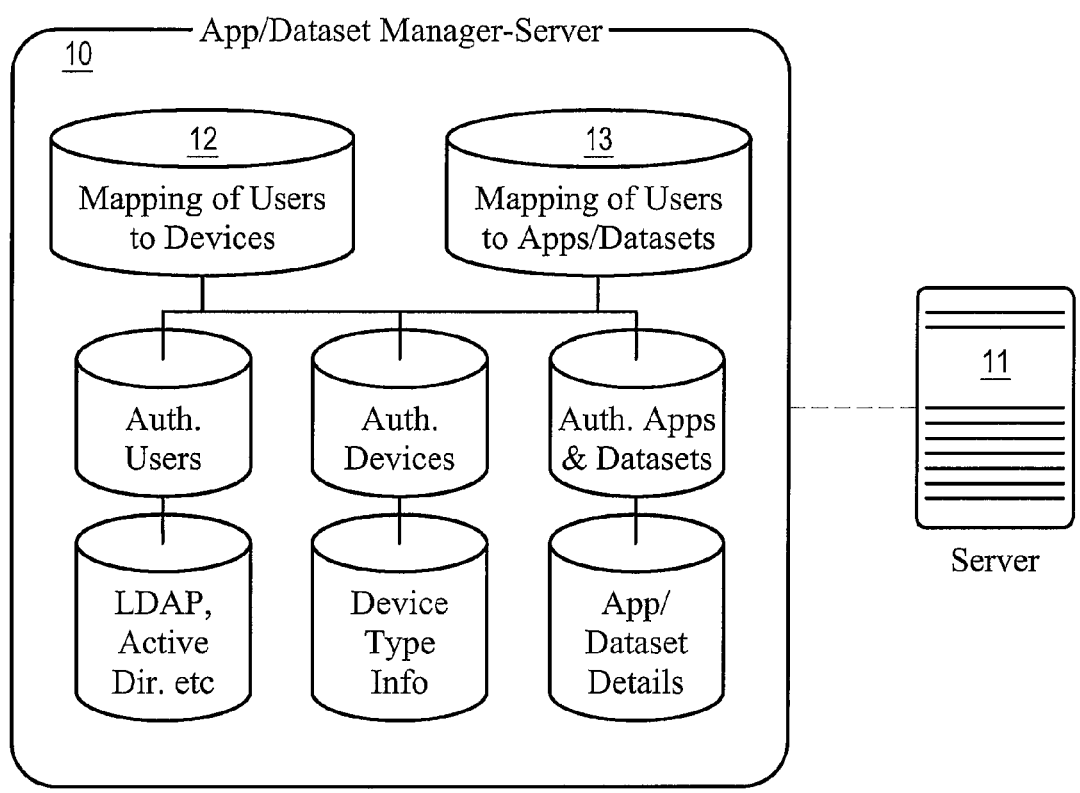
FIG. 1 is an illustration of an embodiment of the Application/Dataset Manager, a component of the server.

1. Application/Dataset Manager—Server: Assigning Server-Side Access to Users and Client Devices As shown in FIG. 1, in one embodiment of the present invention, an 'application/dataset manager' component 10 is installed on a server 11. This component is used to maintain a set of authorized users, a set of authorized client devices, a mapping of which users are associated with which client devices 12, a set of applications and datasets that can be provided to client devices, and a mapping of which users are associated with which applications and datasets 13.

Users are defined in terms of authentication credentials such as a user name and password which can be augmented to include reference to the presence of other authentication factors (e.g., hardware dongle, fingerprint scan, etc.). Devices are associated with unique identifying criteria such as a unique ethernet address, a device serial number that can be reported by the device, a 'device signature' based on some combination of factors, or other existing techniques. Additional database tables are specified to allow each unique device to be associated with a device type and version (e.g., BlackBerry device, PocketPC device, Windows Mobile device, PalmOS device). Each device type, in turn, can be defined in a table with additional information that specifies default or preferred locations where applications or data can or should be installed on the client device.

The mapping of users to client devices 12 typically is implemented with a table in a standard relational database where the presence of a row in the database table containing both a user ID and a device ID indicates that the specified user is allowed access to the specified client device. The application/dataset manager 10 also maintains a list of applications and datasets the users and client devices may be allowed to access. Each application or dataset is specified by a name, unique identifier, version number, and device type supported. Each application or dataset can also be assigned an access duration value (either a fixed date/time at which access expires or a duration after which access rights must be re-established). This duration value is used as the 'lease key duration' value that is discussed in the next section. Each application or dataset is further described with sufficient information to describe the manner in which the application is made accessible to authorized users. For example, an application can be described as an application provided to a particular device type in installer format where the location of that installer can be found (so it can be downloaded to an authorized client as necessary). A dataset can be described in terms of the device type(s) for which that data set is usable and a set of commands that can be executed to run the necessary operations and transformations (e.g., database query and output format) in order to produce the dataset (which can be downloaded to an authorized client as necessary).

Finally, the application/dataset manager 10 is used to map user IDs to the application IDs that the users are allowed access. For example, the presence of a row in the database table containing a user ID, an application/dataset ID, and an 'access allowed' boolean value of 'true' indicates that the specified user is allowed access to the given application. Note that the user can be provided access to that application/dataset on a specific device only if (a) the user is allowed access to the application/dataset; and (b) the application/dataset is provided for the given client device type. Note also that the user will be denied access to application/dataset if either (a) there is a table row containing the user ID, the application/dataset ID, and an 'access allowed' Boolean value of 'false' or (b) there is no table row containing the user ID and the application/dataset ID. (These 2 choices are provided to allow explicit de-authorization (the former) or implicit de-authorization (the latter).).

2. Bootstrapping: Configuring the Client Infrastructure on the Client Device

Figure 2:
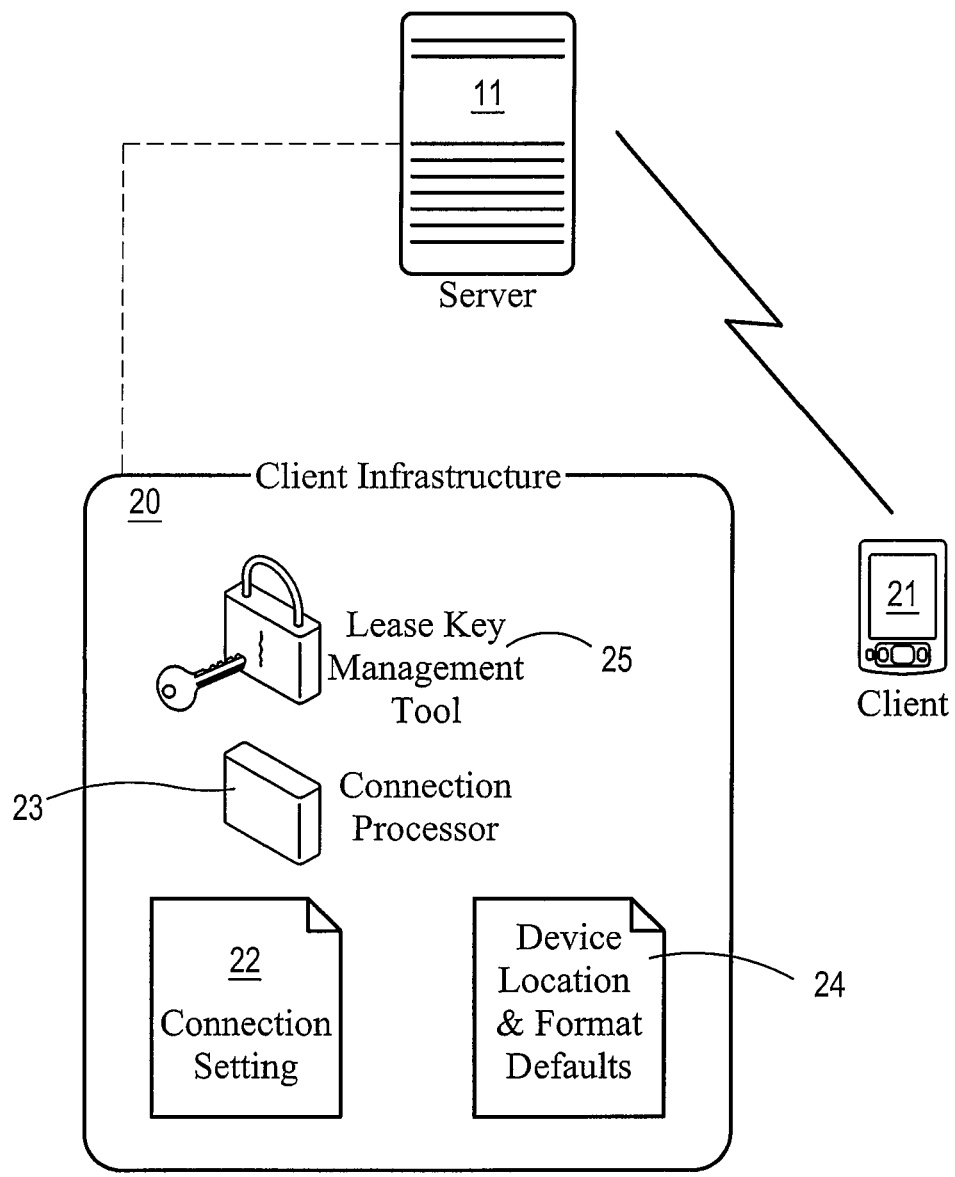
FIG. 2 is an illustration of an embodiment of the Client Infrastructure that is sent from the server to the client.

As illustrated in FIG. 2, before the client can access applications and/or datasets on the server, the client must be configured with the software 20 that enables subsequent operations to successfully transfer and use the applications and/or datasets that are made available to the client 21 from the server 11. The configuration process can be initiated by the server 11 (in which case the configuration information is pushed to the client) or by the client 21 (in which case the configuration information is pulled to the client). In either case, a connection is established between the client 21 and the server 11.

In a server-initiated configuration, the server 11 is given an identifier for one or more client devices needing to be configured. The identifier can include without limitation a unique hardware ID (e.g., an Ethernet or 'MAC' address), a known TCP/IP address, a known device type and device name. This identifier is used to discover the client on the network. Once discovered, the server 11 makes a connection to the client and pushes an installation of the client infrastructure 20 to the client 21.

In a client-initiated configuration, the client 21 is given an address for the server that will provide the configuration infrastructure to the client. The address can be a URL (uniform resource locator), a known TCP/IP address, etc. The client 21 uses this address to establish a connection to the server 11. Once this connection is established, the client 21 presents authentication credentials to the server 11 (e.g., a username and password). Once the connection has been authenticated, the client initiates the process of pulling the installation of the client infrastructure 20 to the client.

Regardless whether the configuration is initiated by the server or the client, the configuration data of the client infrastructure includes the same components. These components are transferred from the server 11 to the client 21 and include the following:

Connection setting 22. This setting provides the information necessary for the client 21 to re-establish a connection to the server 11 when needed. Connection settings 22 can include a URL or network address of the server that will provide the connection in the future.

Connection Processor 23. This tool implements the basic mechanisms by which the client infrastructure connects to the infrastructure on the server 11. It establishes the communication channel that allows a connection setting 22 (described above) to be used by the client 21 such that the connection is authenticated and enabled to allow the client 21 to retrieve application and/or dataset updates from the server 11 (via the server's application/dataset manager 10).

Location/representation of managed application and dataset descriptions 24. The bootstrapping process allows the server to specify a location and representation that will be used on the client device 21 to store the description of the application(s) and dataset(s) on the device. This description information will specify where the client should store an enumeration of applications and datasets on the client device 21 and a representation identifier that specifies how this enumeration should be stored. For example, the location may be specified on a non-file system device (e.g., a BlackBerry) as an object identifier address of the enumeration in the system object store or memory heap. On a file system device (e.g., a Windows Mobile PDA), the location can be specified as a relative or absolute path or registry key. The representation identifier allows the server 11 to tell the client side of the infrastructure what representation format should be used for the particular device 21. For example, some devices may want to use an XML representation of the enumeration while others may better utilize a linked list, pointer-based representation. The representation identifier may also be used to specify how the enumeration is encrypted on the client 21 (e.g., use of an encrypted file, encrypted XML) and, if necessary, the encryption key to be used for the encryption.

- Each application/dataset that will be stored in this enumeration (at the given location and in the given representation) will include information that the client 21 can use to locate and manage the application/dataset. For example, each application or dataset will have a unique identifier, an application/dataset name, a location on the client device 21 of that application or dataset (specified similarly to the location of the enumeration itself), and any lease key (or a pointer to the location of a least key) that is being used to limit access to the application or dataset.
- Initially, the specified enumeration (at the location and in the representation specified) contains no data (or a representation of an empty dataset). The intention of this aspect of the bootstrapping process is to provide sufficient information to the client such that the enumeration can be cached on the client device 21 once the server 11 transfers this information to the client 21 (described later in this section).
- 'Lease Key' management tool 25. This tool is downloaded to and run on the client device 21 to create or delete a 'lease key' on the client device 21. The lease key is a hashed value that is generated using client-side information about the user, client device ID, application/dataset ID, and lease key duration. The lease key is a secure representation, such that it can't be easily created or manipulated by an unauthorized third party. The lease key management tool 25 can also set a system level timer that can perform some action when the timer expires. This is discussed further in the discussions of the creation of a lease key and the expiration of a lease key time. This generated 'lease key' is used to determine if requested access to associated applications or dataset is allowed by the requested user and device at the requested time.

The lease key management tool 25 downloaded to a client 21 can be device-specific since it is provided in the context of the device's bootstrapping process. For example, a BlackBerry could receive a different management tool than a Windows mobile PDA or a BREW cell phone. However, it could also be device-independent Java code if multiple devices support it. The lease key management tool 25 downloaded to the client 21 has sufficient information to know the specific data format of lease keys that should be created for the type of device the tool is being run on (such that a system level timer can be set).

Figure 3:
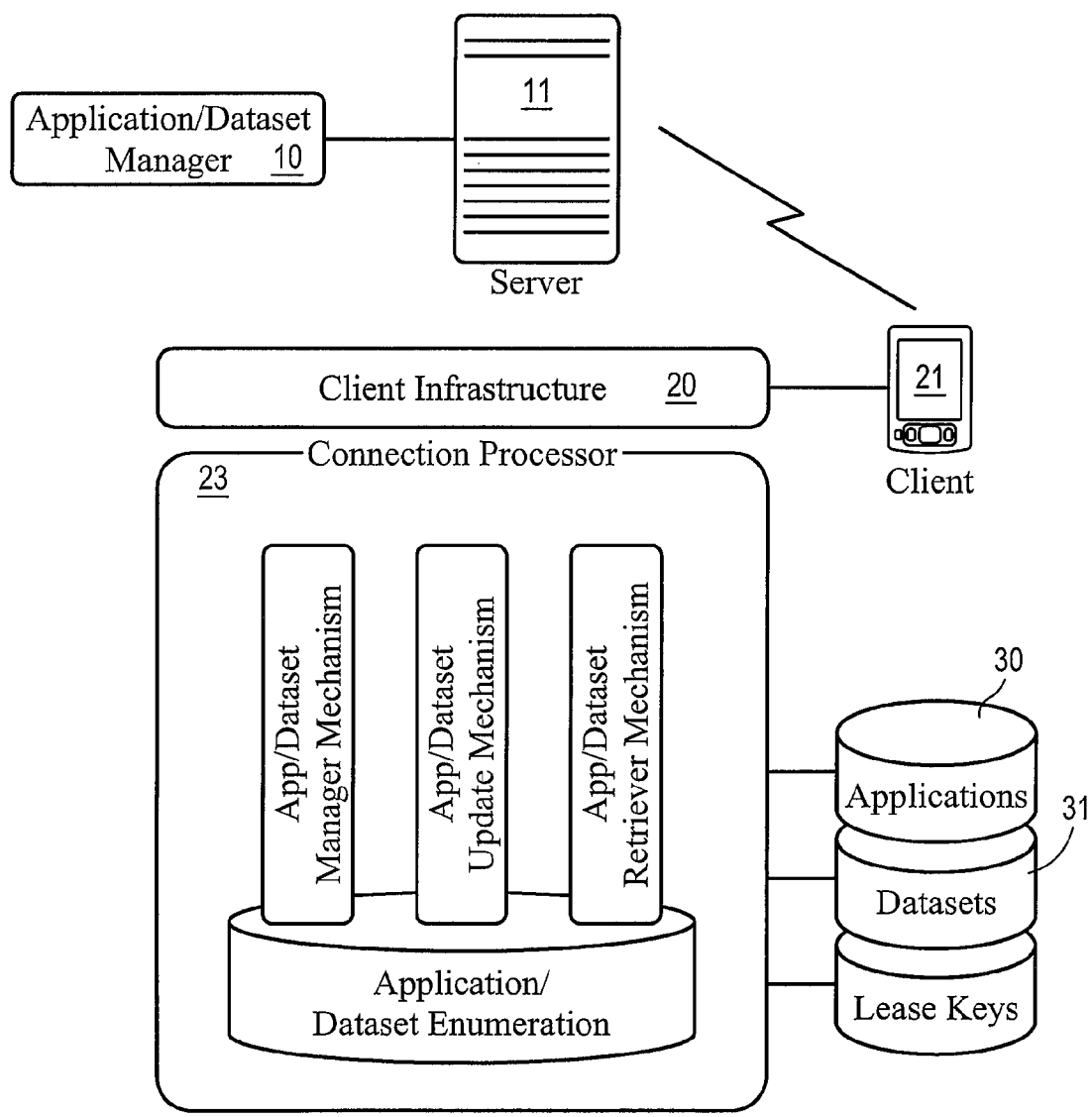
FIG. 3 is an illustration of the embodiment of the Connection Processor.

As shown in FIG. 3, once the client device 21 has been configured to work with the server 11 (as described in the previous step), the client's 'connection processor' 23 is used to establish a connection between the client 21 and the server 11 and—in the context of that connection (including access to the server's application/dataset manager 10)—perform operations related to the associated applications 30 and datasets 31 on the client 21. The 'connection processor' 23 can be invoked whenever access to or information about the applications 30 or datasets 31 is needed. Typically, the 'connection processor' 23 is invoked on demand (a) when the user's interaction with the applications 30 or datasets 31 on the client device 21 requires a connection (e.g., an explicit request by the user to log into the server to get an application or data) or (b) when triggered by an application or system need. Detailed descriptions of the use of the connection processor 23 are provided in subsequent sections of this description.

Figure 4:
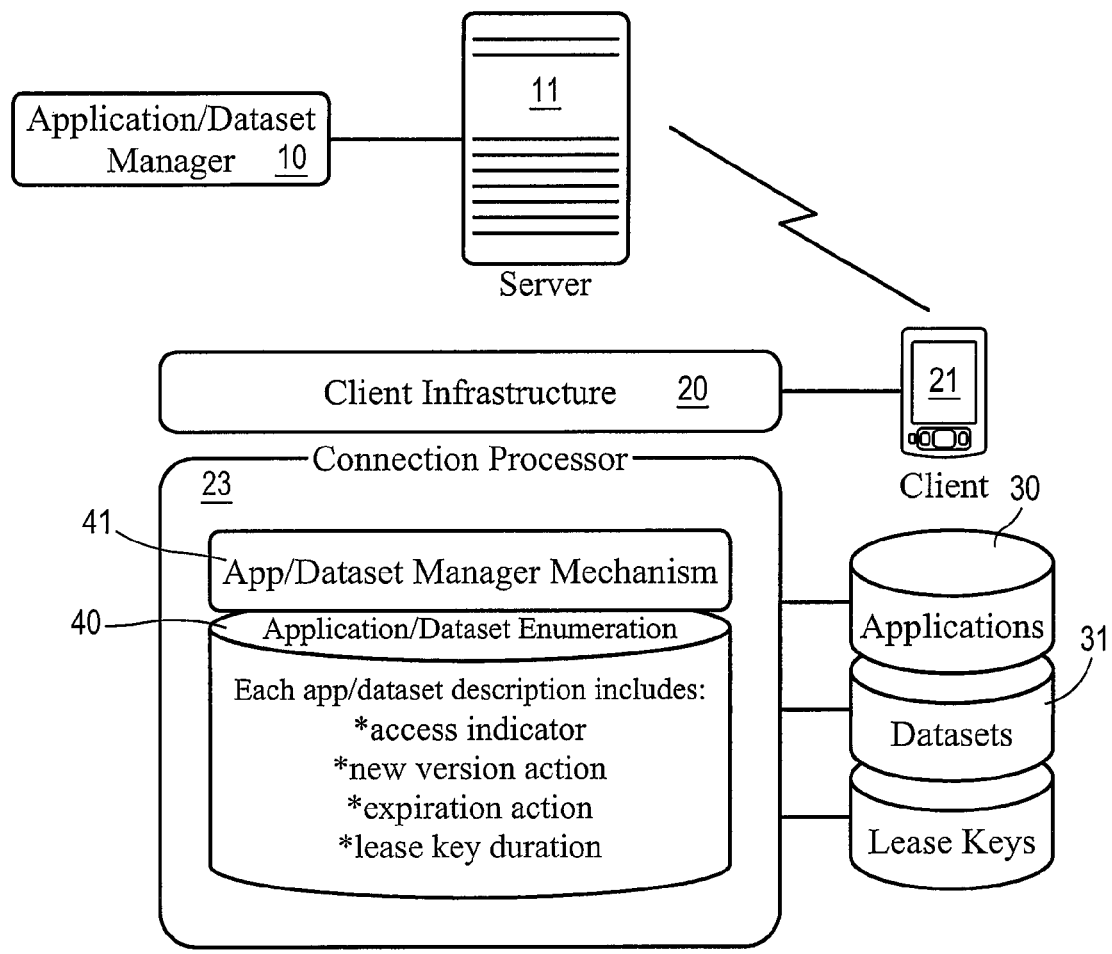
FIG. 4 is an illustration of an embodiment of the Application/Dataset Manager Mechanism, a component of the Connection Processor.
Figure 5:
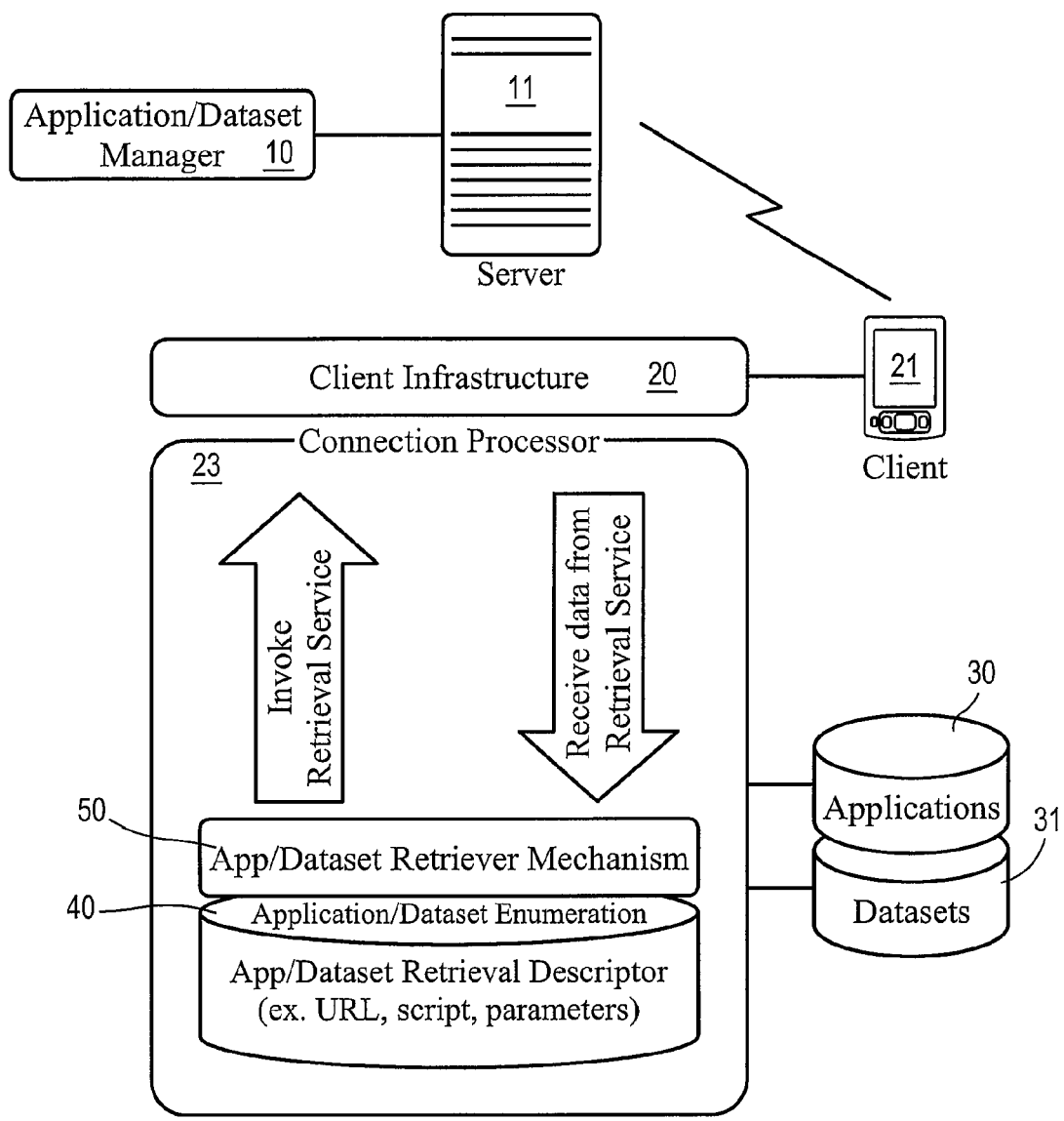
FIG. 5 is an illustration of an embodiment of the Application/Dataset Retriever component of the Connection Processor.
Figure 6:
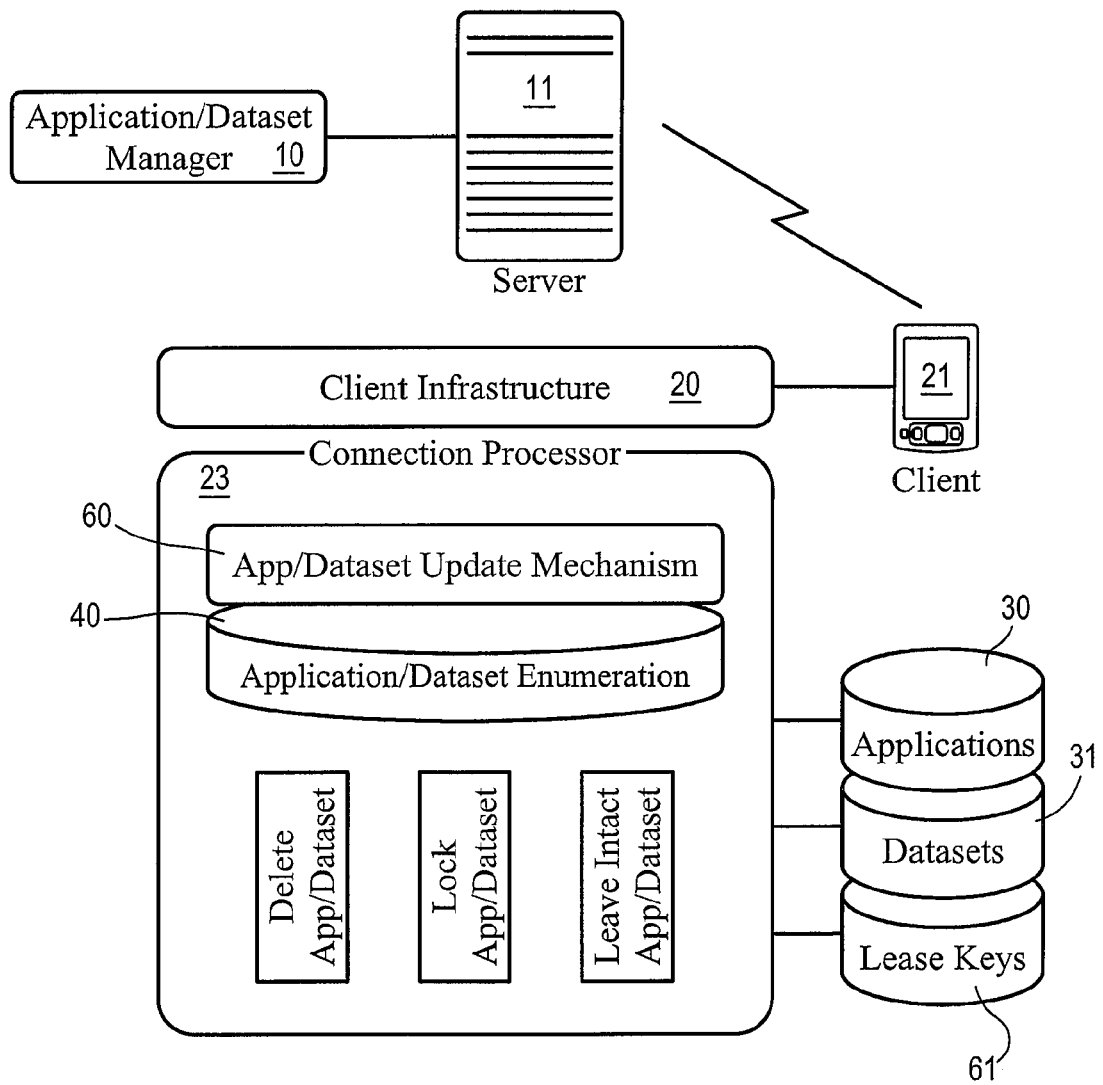
FIG. 6 is an illustration of an embodiment of the Application/Dataset Update component of the Connection Processor.
Figure 7:
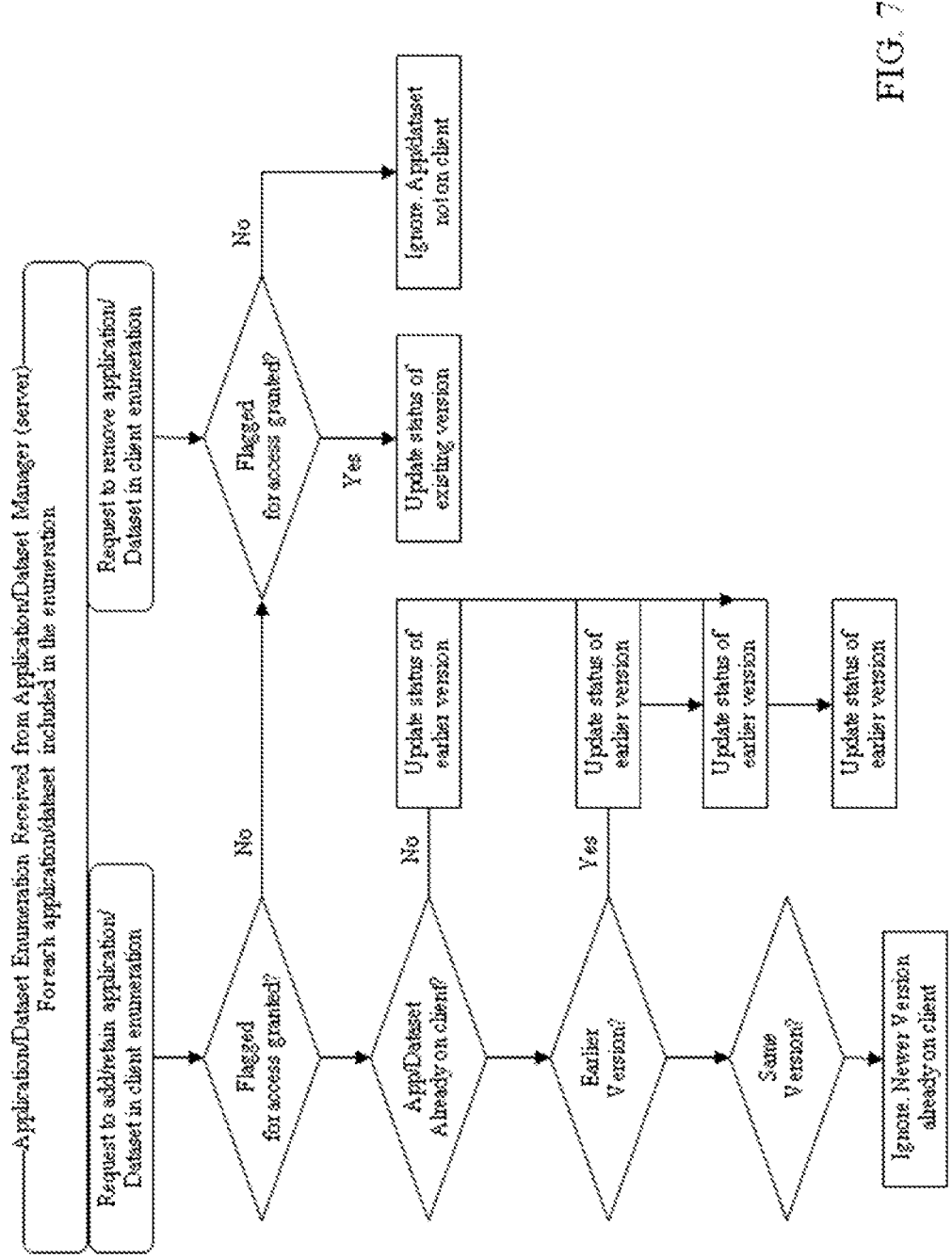
FIG. 7 is a flow diagram of an embodiment of the Connection Processor functionality.

The connection cannot be established without proper authentication, and once established, all communication using the connection is encrypted using established communication encryption techniques. The connection is the central point of contact through which protected applications and datasets are installed, uninstalled, updated, or deleted. Various useful mechanisms that can be programmed within the Connection Processor 23 include the following:

- Application/Dataset Manager: As shown in FIG. 4, the application/dataset manager mechanism 41, located on the client device 21, maintains the enumeration of system applications and datasets 40 that are explicitly authorized or not authorized for this user/device. Any application 30 or dataset 31 not in the enumeration 40 is implicitly not authorized. During operation, the connection processor 23 retrieves from the server 11 an enumeration or partial enumeration 40 for the user/device. The application/dataset manager mechanism 41 then compares the incoming enumeration and makes any necessary changes to the client's enumeration 40. This can include: adding/removing application or dataset access, and noting that a new version supersedes an existing version.
- Application/Dataset Retriever: As illustrated in FIG. 5, the application/dataset retriever 50 initiates and/or monitors the activity necessary to receive/retrieve/store the authorized applications 30 and datasets 31 on the client 21. The application/dataset retriever 50 is triggered when the connection processor 23 detects a new application/dataset (or a new version) in the enumeration 40 sent to the client 21 from the server 11. The application/dataset retriever 50 then requests the new applications or datasets from the application/dataset manager 10. The application/dataset manager 10 then determines the proper format for the requesting client device 21 and sends the appropriate application/datasets to the client device 21. The connection processor 23 receives the new application/datasets and stores it on the client device 21 in the location specified in the application/dataset enumeration 40. If the application/dataset enumeration 40 specifies, the received data may be encrypted upon receipt.
- Application/Dataset Update: As shown in FIG. 6, the application/dataset update mechanism 60 manages the current state of information about the applications and datasets in the enumeration mentioned above. This component uses the enumeration passed to the client 21 from the server 11 and acts on any changes to the client's current enumeration 40 to keep the client device synchronized with the server 11. Actions that can be taken or initiated by the application/dataset update mechanism 60 can include adding, deleting, maintain access rights for applications 30 and datasets 31 on the client device 21 (which in turn may trigger the creation or deletion of lease keys 61). Marking an existing application or dataset as an 'old' version, deleting an application or dataset from the client device's local storage, and initiating the Application/Dataset Retriever 50 when necessary. FIG. 7 is a flow diagram of an embodiment of how the application/dataset update method can handle each application/dataset returned in the enumeration from the server 11.

3. Connection Processor—Application/Dataset Manager: Managing the Applications and Datasets on the Client Device The Connection Processor's 23 connection can be established in response to two types of connection requests: (1) a request to verify that a specified user has access to a given application or dataset or (2) a request for an enumeration of all application(s) and/or dataset(s) to which the user's access is allowed or disallowed. When a connection request is made to verify that a specified user has access to a given application and/or dataset, the client 21 creates a request that includes a representation of the user ID, device ID, and one or more application/dataset IDs for which the client 21 needs to verify access rights. The request is represented in a known format (e.g., a pre-defined record layout or XML representation). Using the connection settings and configuration tool 22 (specified earlier), the client 21 establishes a connection to the server 11 and sends the request to the server 11. If a connection to the server 11 can be established successfully, the server 11 uses the information in the request and compares the user ID, device ID, and application/dataset ID(s) to the information available to the application/dataset manager 10. The server 11 responds to the request with an application/dataset enumeration containing only the application(s) and/or dataset (s) mentioned in the request. (That is, the response is potentially a partial enumeration of the full set of application/dataset information available to the user and device).

When a connection request is made to retrieve a complete enumeration of application(s) 30 and dataset(s) 31 associated with the given user and device, the client 21 attempts a connection to the server 11 and sends a request designed to retrieve the complete enumeration. This is the equivalent of a special case of the partial enumeration request described above with the requested set of application(s)/dataset(s) described as 'all'. After successfully establishing the connection and sending the request, the server 11 responds by transmitting the complete enumeration of the application(s) and/or dataset(s) 40 that the client is authorized to access (or no longer authorized to access) to the client 21. In each scenario, the response to the request is an enumeration of application (s)/dataset(s) for which the present invention is managing access. The only difference is whether the enumeration is a complete enumeration or a partial enumeration. (The representation of the enumeration is marked so the recipient of the response can determine whether the enumeration is complete or partial.)

Each application 30 or dataset 31 in the enumeration 40 is described in terms of retrieval information and access permission information. The retrieval information for each application/dataset in the enumeration 40 includes all of the server information and client information necessary for that application 30 or dataset 31 to be placed onto the client 21. The server information can include the program/dataset name, a program/dataset version indicator, a descriptor sufficient to give the client 21 a way to retrieve the program from the server 11 (e.g., an XML-based web service locator), and any program parameters that must be specified to the server 21 in order to retrieve the application 30 or dataset 31. The client information can include the local location (file system or other persistent storage location) where the retrieved application or data should be placed. The access permission information for each application/dataset in the enumeration 40 includes an access granted/denied indicator, an indicator to specify whether the application/dataset should be locked or deleted if/when access is disallowed, an indicator to specify whether previous versions of the application/dataset should be deleted, locked, or allowed to remain accessible if/when a new version of the application/dataset is provided, an indicator to specify whether the current version should be deleted or locked if/when the application/dataset's lease key expires, and a lease key duration setting for the application/dataset.

The Lease Key Duration Setting

The lease key duration setting is used whenever a lease key 61 is generated (defined later in this document). The setting can be specified as a (relative) number of minutes or as a specific time. If specified as a relative time (e.g., some number of minutes), this lease key duration is added to the current system time when a lease key 61 is created to generate a key that expires at the time represented by the current system time+the duration. If specified as a fixed time, any generated lease key 61 is created to expire at the specific time provided. When the application/dataset enumeration 40 (including each entry's lease key duration setting) has been transmitted to the client 21, the client uses the results of the enumeration 40 to update the contents of the cached application/dataset as described in above (referred to below as 'the local information').

For any application/dataset that is being added, changed, retained (an application is considered 'retained' when it appears in the application/dataset enumeration 40 returned by the server 11 with no change in version or access restriction), or deleted in the local cache, the client 21 performs the following operations:

If the application/dataset is being added, changed, or retained and if the application/dataset is flagged for access granted:

The client 21 uses the local location information to determine if the application/dataset is already on the client 21 and, if so, which version is on the client 21.

If the version of the application/dataset specified in the enumeration 40 already exists on the client 21, then a new lease key 61 for the given application/dataset is created and processing proceeds to the next item in the enumeration 40. (The effect of the new lease key is to extend the user's/device's allowed access.)

If an earlier version of the application/dataset specified in the enumeration 40 exists on the client 21, the client initiates a process to update the status of the existing version on the client 21 and continues processing as if no version of the application/dataset exists on the client. The new version is retrieved in the next step.

If no version of the application/dataset specified in the enumeration 40 exists on the client 21 (or, as mentioned above, a previous version has had its status updated), the client 21 uses the remaining information provided in the enumeration 40 to locate and initiate the mechanism 50 that retrieves the application/dataset to the client 21. The success or failure of the mechanism's retrieval of the application/dataset to the client 21 is noted. If the installation/download was successful, a new lease key 61 is created for the application/dataset and processing proceeds to the next item in the enumeration 40.

If the application/dataset is being removed or if the application/dataset is being added or changed and it is flagged for access denied:

The client 21 uses the local location information to determine if the application/dataset is already on the client 21.

If any version of the application/dataset specified in the enumeration 40 exists on the client 21, the update mechanism 60 is initiated to update the status of the application/dataset on the client 21. Any existing lease key 61 for the application/dataset is also deleted (or a system event to trigger the expiration of the lease key can be fired). The success or failure of the mechanism's lock/deletion is noted and processing proceeds to the next item in the enumeration 40.

If no version of the application dataset specified in the enumeration exists on the client 21, processing will proceed to the next item in the enumeration 40.

After each item in the enumeration 40 has been processed, the 'connection processor' 23 determines whether any step of the processing has returned a failure code. At the successful conclusion of the session (meaning that the operations of the session all completed successfully and that the session has been successfully completed), the connection processor 23 returns a success code. If the connection's session does not complete successfully (e.g., one or more operations requested during the session failed), the connection processor 23 returns a failure code. When the session has been completed, the local cache of the application/dataset enumeration 40 has been updated. The state of the applications/datasets in the enumeration 40 (either partial or complete) is also up-to-date when the session completes.

4. Connection Processor—Application/Dataset Retriever: Retrieving an Application/Dataset from the Server As illustrated in FIG. 5, when the Connection Processor's 23 Application/Dataset Manager 10 detects the availability of a new application 30 or dataset 31 (or a new version of an existing application/dataset), the application/dataset manager 10 triggers the Application/Dataset Retriever 50 to retrieve the application 30 or dataset 31 from the server 11. This Application/Dataset retriever 50 gets the retrieval descriptor and parameters from the local application/dataset cache and invokes that program/web service to get the application/dataset from the server 11. The server side components of the present invention specify and manage the format of the application/dataset that is downloaded. The bytes transferred from the server 11 to the client 21 are encrypted throughout the transmission (as are all communications between the client and server). Since the context of the connection processor 23 provides information about the user and device 21 for which the application/dataset is being provided, the server side of the infrastructure is also able to provide the application/dataset is being provided, the server side of the infrastructure is also able to provide the application/dataset is being provided, the server side of the infrastructure is also able to provide the application/dataset in a format that will be adequately protected on the client device 21. Some formats will not need any further processing on the client 21 in order for the application/datasets (e.g., baseline applications or non-sensitive data) are transmitted in a form that is stored on the client 21 without special protection (since it is other data used by the application that needs to be made secure). In other cases, a dataset may be transmitted to the client 21 in a form that is already protected (e.g., a proprietary compressed format that requires special code to access—and where it is assumed that the secured application on the device includes the special code necessary to read the data).

Other applications 30 or datasets 31 may need the client side of the infrastructure to provide further protection once the transfer from the server to the client is complete. For example, a dataset provided in a 'plain text' XML representation or a standard Excel file may need to be transformed into an encrypted XML format or encrypted Excel file for storage on the client. In these cases, the retrieval descriptor will include instructions necessary (typically embodied in a script) for the client to download and locally protect the downloaded application/dataset.

5. Connection Processor: Updating the Status of an Application or Dataset on the Client Device When access to a specific application 30 or dataset 31 is being denied or supplanted by a newer version, the 'connection processor' 23 triggers one of three operations that update the status of that application/dataset on the client 21. As shown in FIG. 6, the updating mechanism 60 uses locally cached information about the application/dataset to select and trigger the appropriate action:

(1) The application/dataset can be deleted. This action implements the system's ability to force an application/dataset to be deleted when access is specifically denied to a user. This action can also be specified to remove an old version of an application 30 or dataset 31 when the new version is intended to completely and immediately replace the old version and also may delete the associated lease key 61;

(2) The application/dataset can be locked. Giving the client 21 an ability to lock the application/dataset provides the system with the ability to temporarily render an application 30 unusable. This action is preferred when there is a need to restrict access to the application/dataset but there is no immediate need for the application/dataset to be deleted. This may be desired when the access restriction may be temporary and it is desirable to minimize the need to re-download the application/dataset (especially in restricted bandwidth environments). The locking action itself can be implemented in a variety of ways. The simplest way is to modify the application/dataset's associated lease key 61 to some value that will never allow access, such as to provide a fixed time with some initial time value (such as time/date of all zeroes) to the lease key generator. Other implementations may choose to encrypt the application/dataset using some other encryption key; or (3) The application/dataset can be left intact. This action is typically only used when a new version of an application/dataset has been made available or a superseded version is being allowed to remain on the client 21. Depending on the access policy described in the particular application/dataset entry in the enumeration 40, a lease key 61 to allow access to the new or superseded application/dataset may be created.

6. Connection Processor: Lease Key Management

Figure 8:
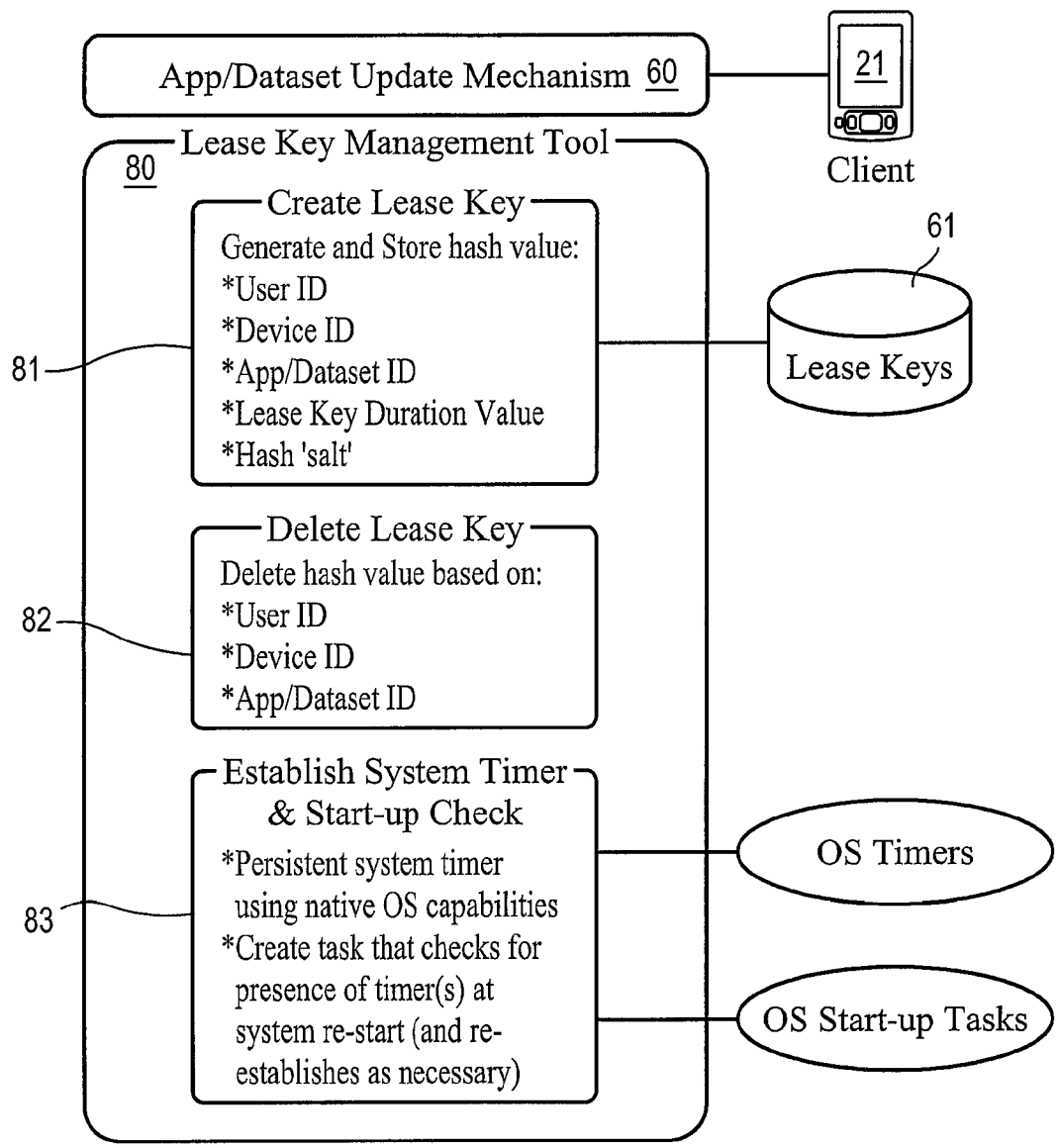
FIG. 8 is an illustration of an embodiment of the Lease Key Management Tool on the Client.

The consistent use of a 'lease key' 61 is the primary mechanism that allows the present invention to control access to the applications 30 and datasets 31 under its control. The lease key management process, as shown in FIG. 8 consists of two basic tasks: the creation of a lease key 81 and the deletion of a lease key 82. Each of these tasks involves the coordination of data such that the key value itself is added or deleted from the set of lease keys 61 associated with the user/device; and the coordination of a system timer and system start-up check 83 related to the lease key 61 that was added or deleted. These tasks are performed by the lease key management tool 80.

Each of these 'lease key' tasks consists of two related steps: the creation/deletion of the lease key data on the client device 21, and the establishment/removal of a system-level timer 83 that is set to trigger an action when the lease key 61 expires. This two-step process is performed by the lease key management tool 80.

The lease key creation process is run on demand in response to an Application/Dataset Update action that is directing the creation or renewal of access rights to a specific application/dataset for the user/device. This typically occurs when a client session of the connection processor 23 receives new or updated authorization information about a specific application/dataset on the user's client device 21. This authorization information can be received when a new or existing application's access control information has changed on the server 11 since a previous session or in response to an authorization check on a specific application/dataset whose current lease key 61 has expired.

(1) Creation of the lease key 'data'. The lease key 61 is a hash value generated from client side information (the user ID, the client device ID, the application/dataset ID, and lease key duration value) as well as a hash 'salt'. The lease key management tool 80 gathers these pieces of information from the configuration data (that may be encrypted) and calculates the hash value based on the information. This hash value (called simply the 'lease key' 61) is stored in the local device's enumeration 40 of configuration data for the given application/dataset to control access to the application/dataset. (This is covered in more detail later in the document.)

In some implementations, this hash value may be encrypted with a key that is accessible only when another security factor is available (e.g., strong password, biometric scan, hardware-level encryption key, etc.). However, this extra layer of security is not always necessary since decoding the hash value would still result in data that would only be useful if the value was decoded on a machine that could validate that it was the specific device ID running the specific application/dataset ID on behalf of the given user ID.

(2) Establishing a persistent system timer and start-up check. After the lease key 'data' has been created, the lease key management tool 80 establishes a persistent system timer 83 according to the standard capabilities of the device's native operating system. This timer is defined to trigger a specific system activity when the timer is fired. (A description of what the timer expiration process actually does is described later in this document.)

(2) Establishing a persistent system timer and start-up check. After the lease key 'data' has been created, as shown in FIG. 8, the lease key management tool 80 establishes a persistent system timer 83 according to the standard capabilities of the device's native operating system. This timer is defined to trigger a specific system activity when the timer is fired. (A description of what the timer expiration process actually does is described later in this document.)

The lease key management tool 80 causes the system timer to fire when the lease key 61 being created expires and provides a callback routine that is called when the timer expires. The lease key management tool 80 encapsulates device-specific code specifically for this purpose. Since the lease key management tool 80 that was downloaded to the client 21 is aware of the device type, the version of the lease key management tool 80 that is on the client 21 implements the proper system calls to establish the timer and to provide the proper payload of the process that will run when the timer expires.

A system start-up task for the client 21 is also established. This start-up task verifies the existence of the timer (or re-creates the timer if it's missing) after a system restart. The start-up task is another program encapsulated by the lease key management tool 80 that has provisions for detecting clock rollback attempts by comparing the current system time to see if it's beyond (or before) some defined range from the last known successful connection.

The lease key deletion process 82 is run on demand in response to an Application/Dataset Update action that is directing the denial of access rights to a specific application/dataset for the user/device. This typically occurs when a client session of the connection processor 23 receives a directive to deny access to a specific application/dataset when updated authorization information about a specific application/dataset on the user's device 21 is received.

(1) Deletion of the lease key 'data'. The lease key deletion process 82 receives the user ID, client device ID, and the application/dataset ID that together specify the access authorization that is to be removed. This information is used to find any existing lease key 61 for this user/device/application/dataset combination and, if a related lease key 61 is found, that lease key 61 is removed from the device's 21 lease key table.

(2) Removal of persistent timer and start-up check. This step of the process uses the user/device/application/dataset combination mentioned above and looks for any associated system timer and/or start-up check (established when the lease key was created). If an associated system timer and/or start-up check is found, it is removed from the system.

Once the application(s) or dataset(s) 30, 31 (and any associated lease keys 61, system timers, etc.,) have been placed on the client device 21 (using the mechanism described in the previous section), the user of the client device 21 runs the application(s) 30 or accesses the dataset(s) 31 as they would any other application or datasets on their client device. The applications appear as normal applications on the client device's 21 application list (e.g., the Start/Programs menu on a Windows Mobile device or the launch screen of a BlackBerry) and the datasets 31 are seen by the appropriate application 30 (e.g., in the associated 'Open' menu of the related application). The access control/restriction is performed by the steps that were taken in the deployment of the applications 30 and datasets 31 to the client device 21, not by any change in user behavior that has to be taught to the user and enforced.

In the following sections, the steps that the present invention uses to control the access to a secured application or dataset are described. The various combinations in which the secured applications or datasets can be accessed or used on the client device are described, along with how the desired access is granted or provided. These combinations include the following: (a) accessing a secured application or dataset from the client's file system or persistent store interface/browser, (b) launching a secured application and using that application to access either secured datasets or normal datasets, and (c) using secured datasets from a 'normal' application.

7. Accessing/Using an Enabled Application or Dataset from the Client's 'Normal' File System or Persistent Store Interface/Browser.

Typically, an application secured by the present invention appears in the user's launch window, start menu, or equivalent so it can be found, seen, and run from the normal interface the device uses to start an application. Though not required, a secured dataset often will be stored on the client device as a hidden file or placed in the device's persistent object store without an easy-to-navigate path to the dataset. This decision concerning whether to hide the dataset is usually determined by whether the dataset is intended to be used with an application secured by the present invention (that knows where to find the dataset) or whether the dataset is used by a normal, non-secure application that is going to use its normal 'File/Open' interface to find and open the dataset. For both secured applications and secured datasets, the security of the application or dataset does not rest solely on the visibility or invisibility of the application or dataset. Instead, security is built into the application or dataset as it is stored on the client device.

Figure 9:
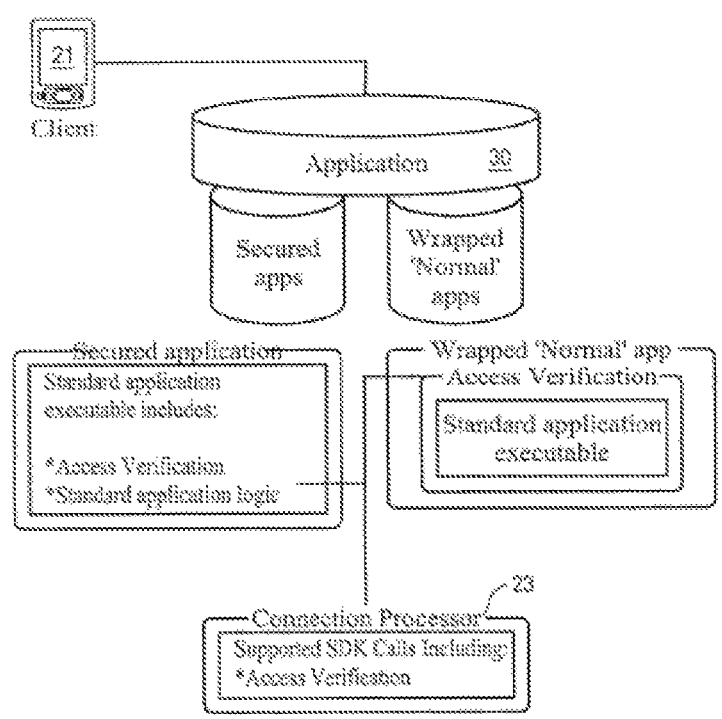
FIG. 9 is an illustration of an embodiment of the present invention's protection of applications.

Generally, an application secured by the present invention is placed on the client device using the connection processor mechanism described earlier. In alternative embodiments, the secured application may be placed on a client device manually or by any other software distribution process. Since the application is downloaded with a context of a specific user and client device for which it is being deployed, there are two mechanism that can be used to enable the application to be run only on an authorized device on behalf of an authorized user, as shown in FIG. 9: (a) the application has been written to include code that validates an existing lease key 61 on the client device 21 before running the application 30, or (b) a generic application can be 'wrapped' to include similar lease key validation code before unlocking access to the underlying application 30.

The former implementation is an 'SDK approach' and uses function calls and methods available in the API and libraries (downloaded to the client as part of the Connection Processor 23 infrastructure bootstrapping process) that provide access to mechanisms that check for the presence of a valid, active lease key 61 for the application in question.

The latter implementation uses a 'wrapper' mechanism to encapsulate the application executable 'bits' in a container such that access to the underlying application is allowed only when the wrapper code authorizes it. This 'wrapper approach' is similar to the approach used in password-protected, self-extracting archive files or license-protected media files. In these cases, the underlying data is not made accessible to normal operating system calls until the wrapper successfully unlocks the contained data. In cases where it is necessary to unwrap the application into a temporary file on the client device that can be executed, the wrapper mechanism can install a system timer or a file watch service that will monitor the use of the unwrapped file such that the unwrapped application is deleted once it is no longer being executed and/or that watches for potential file copying and deletes or disallows any copies that are made.

Figure 10:
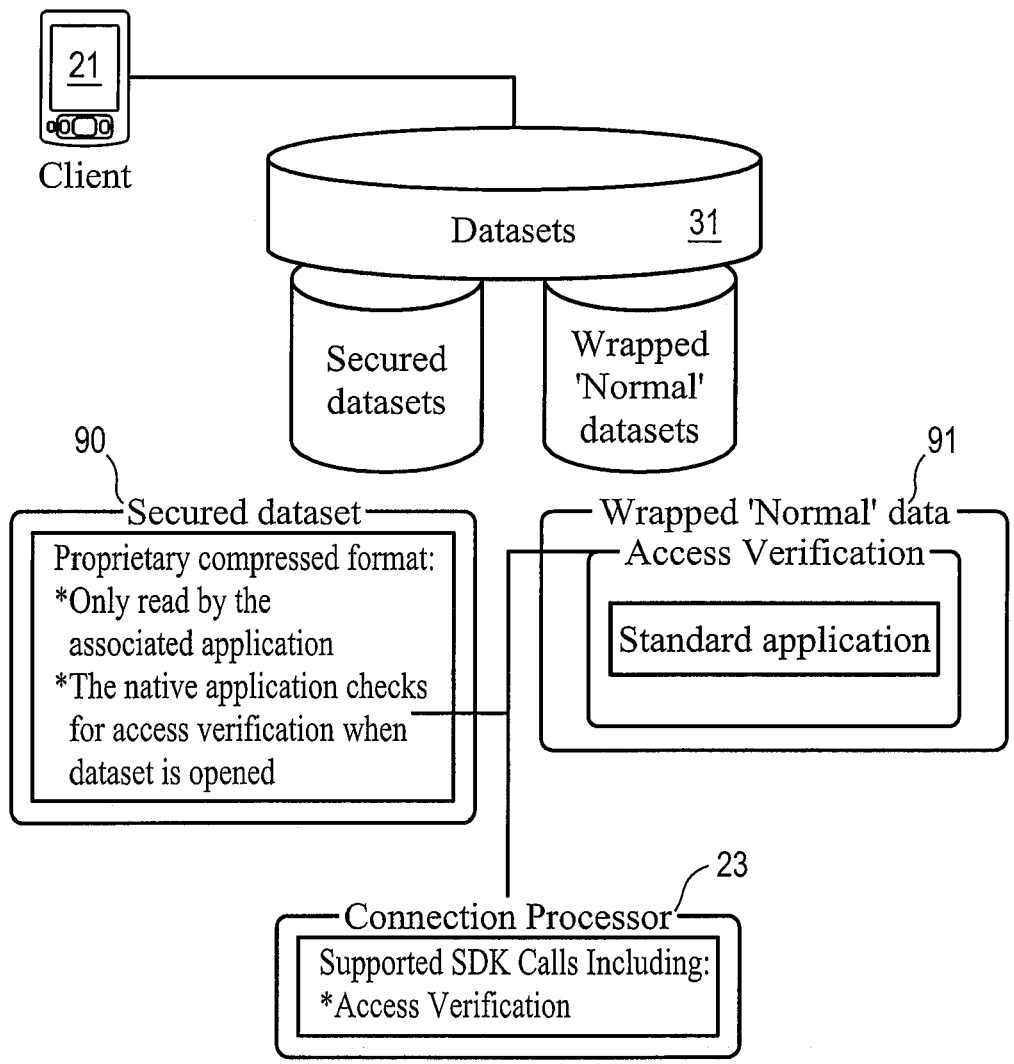
FIG. 10 is an illustration of an embodiment of the present invention's protection of datasets.

As shown in FIG. 10, a dataset 31 secured by the present invention is also placed on the client device 21 using the Connection Processor 23. Since a dataset 31 does not embody executable code, the 'SDK approach' 90 described above does not apply to the protection of datasets. However, the 'wrapper' approach 91 described above does not apply to the protection of datasets. A dataset 31 secured by the present invention is typically stored on the client device 21 as a dataset 31 in a format that is native to the application that opens it (e.g., a compressed data format specific to the present invention, an XML data document, and Excel spreadsheet format) and is then wrapped by (or contained in) code that is specific to the present invention that verifies the presence of a valid, active lease key 61 for the dataset 31.

Though not technically a 'wrapper' approach, in an embodiment of the invention, the dataset is stored on the client device in a specific compressed format. Since this compression mechanism is not well-known and presumably difficult to reverse engineer, the dataset is not formally wrapped inside any additional container layer. Instead, the dataset is allowed to exist on the client device in the compressed format and its presence on the client can be managed by the connection processor and lease key expiration mechanisms described elsewhere in this description. If a connection processor or a lease key expiration event indicates a necessity, the dataset can be deleted or further locked or encrypted.

Beyond this reliance on a specialized, hard-to-decipher data format, it should be noted that there are a variety of established mechanisms that can be used to protect the data using this 'wrapper' approach. As mentioned earlier, the use of mechanisms that are found in password-protected self-extracting archives or license-based media files can be used as dataset 'unwrapping' mechanisms. For example, a dataset made available in an Excel spreadsheet format could be stored on the device inside a container file that appears to be an .xls document. However, opening this file would require unpacking the 'real' contents by running the program that wrapped the data. This unpacking of the dataset could also cause the creation of file system monitoring processes that would watch for the use, movement, or copying of the unwrapped dataset. These system processes could prevent the activity or otherwise monitor the use of the protected dataset.

When packet-by-packet access is needed (rather than just unpacking a data file in memory or to disk), a license-based approach as used by streaming media file types can be used. For example, the Windows Digital Rights Management system provides a mechanism for encoding data into a format that can decrypt (subject to the availability of a valid license) streamed data at a rate of 10 MB/sec. The use of a wrapping capability such as this would allow the lease key information to be used as the license that would unlock the data. Then, an application that wanted access to a data stream rather than a file-based dataset would use this mechanism to unlock the access to the data stream and, upon validation of a lease key that matched the user/client/dataset, the data would be made accessible to the calling application as a 'normal' (unprotected) data stream.

Figure 11:
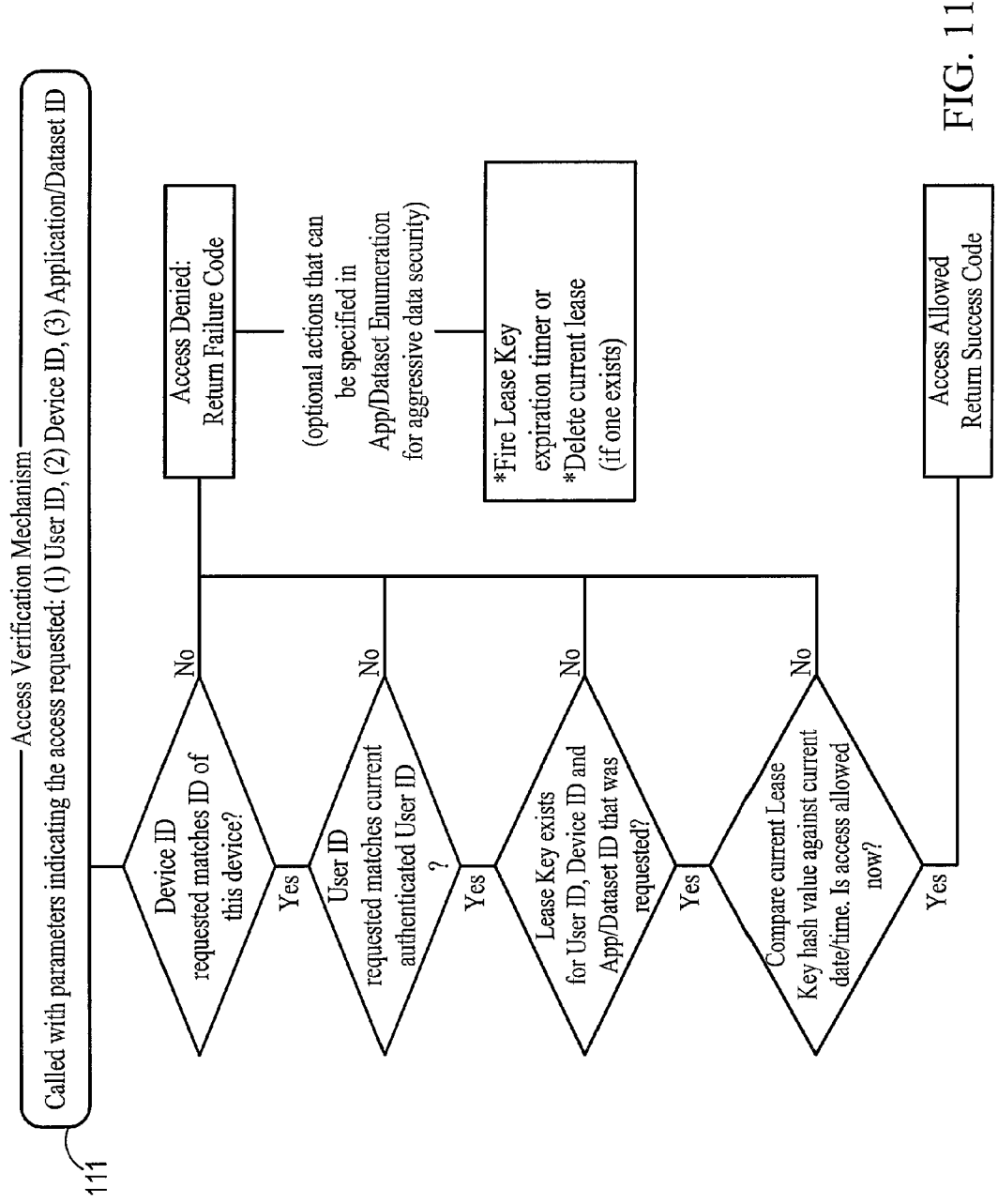
FIG. 11 is a flow diagram of an embodiment of the Access Verification Mechanism on the Client.

Regardless of whether an application or dataset is protected by an SDK or a wrapper approach, the access verification mechanism, as shown in the flow diagram of FIG. 11, provides a common means for determining whether access to the protected content should be allowed or not. This common means is the code to determine whether a currently valid lease key for the application/dataset is present on the client device. The high-level common approach to testing for this lease key is the same whether the code invoking the access check is called from an SDK call in a secured application or is called from a wrapper that is protecting an off-the-shelf application or dataset from use. In each case, a call is made to the 'access verification mechanism' 111 on the client device asking to grant permission to the application/dataset in question. This call will include the identifiers of the user, device, and application/dataset to which access is being requested and the 'access checking' code will go through the following steps:

(a) Compare the requested user and device identifier to the current user and device. This step verifies that the current device context (user/device ID) matches the request. If this comparison succeeds, the check continues to the next step. Otherwise, the check fails and returns.

(b) Using the application/dataset ID that was passed to the 'access verification mechanism' 111 and the user and device identifier, look in the client device's enumeration 40 of current lease keys 61 that are available on the machine for a matching lease key.

(c) If a matching lease key 61 is not found, the check fails and returns.

(d) If a matching lease key 61 is found, compute the hash value of the requested user ID, device ID, application/dataset ID, and current system time and compare the hash value to the lease key hash value to determine if the requested access is allowed. If the requested access is not allowed, the access fails and returns. Optionally, the failure can trigger the immediate firing of a lease key expiration timer if the implementation of the application that called the 'access verification mechanism' wants to aggressively treat a failed access as an opportunity to delete or lock the application/dataset. If the requested access is allowed, the access check returns success. When the access check returns success, the code that called it (either inside a secured application or code triggered by an application/dataset wrapper) can access the data. In the case of an application secured by the present invention that made the call using the SDK, the calling application can continue to the proper execution of the application. This is similar to a license check that is made prior to allowing a user to run commercial programs such as Photoshop. In the case of a wrapped application or dataset, the program in the wrapper that called the access checking code will see the successful return value and will use this value to successfully unlock the wrapped application/dataset.

8. Launching and Using an Application Secured by the Present Invention

Using the application protection mechanisms described in the previous subsection, one can envision how an application secured by the present invention is launched and used. The user of the client device will navigate to the application in the device's file system, Start Menu, application launcher window, etc., and perform the action necessary to run the application. The steps described above are taken to verify that the application is allowed to be run by the particular user on the particular device at the given time. Once the application is open, the application may be used to access one or more related datasets.

If the datasets have been secured by the present invention, the application itself may be programmed to know where to look for one or more specific datasets (e.g., using infrastructure calls to look for one or more dataset IDs in the set of enumerated system applications and datasets) and open the dataset(s). Alternatively, the user may direct the application to one or more particular datasets by navigating though a typical File/Open navigation. Regardless of how the dataset is accessed, an attempt to open a secured dataset will trigger the access checking code as described above to verify that the secured dataset is allowed to be accessed by the current user and client at the current time. In any case, a secured application will not be able to launch and it will not be able to open any secured dataset until the lease keys for the application and the dataset have been validated on the client device.

If the dataset(s) being accessed by the secured application are not secured datasets, then access to the dataset occurs according to the application's normal use. In this case, it is the running of the application that is controlled. Once the application is allowed to run (using the lease key check previously described), it is assumed that the application uses normal provisions for automatically loading or allowing the user to find and open related datasets. It should be noted, however, that the running of the application is further controlled in that the expiration of the application's lease key while the application is running can cause the application's process to be terminated if that behavior is specified in the code that is called when the lease key expires. This can prevent a user from opening an application and leaving it open in an attempt to bypass the lease key check that is performed when the application is launched.

9. Launching and Using a 'Normal' Application to Access a Secured Dataset

In the case when a user wants to use a 'normal' (non-secure) application to access a dataset that has been secured by the present invention, it is assumed that the user launches the 'normal' application by standard means on the device. Then, the user may manually attempt to open the secured dataset or the application may automatically try to open the secured dataset. In either case, the action of opening the secured dataset triggers the wrapper code that surrounds the actual dataset. When the wrapper code is triggered, the access checking process described earlier occurs. If the access check is allowed, then the dataset is made available to the calling program. Once access to the dataset is allowed, it is the responsibility of the wrapped dataset representation to emulate the proper access that has been authorized. It is this expected use that provides some of the motivation for allowing the server to control the format in which the dataset is provided to the client. That is, the code that is provided to the wrapped representation that is sent to the device may vary depending on whether it is expected that the dataset will be used as a file or a data stream on the client device.

If the application is expecting the opening of the dataset to appear as a file on the device, then the dataset is assumed to be protected with an adapter or wrapper that makes the protected dataset appear as a standard data file and then traps the 'File/Open' behavior of the client device and emulates the behavior of providing the protected dataset as a file stream (assuming the lease key is valid). If the application is expecting the opening of the dataset to appear as a data stream, then the dataset is assumed to be protected with a wrapper that similarly can trap the opening of the dataset and emulate the stream-oriented behavior the client device is expecting.

10. Firing of a System Timer Upon Lease Key Expiration

Figure 12:
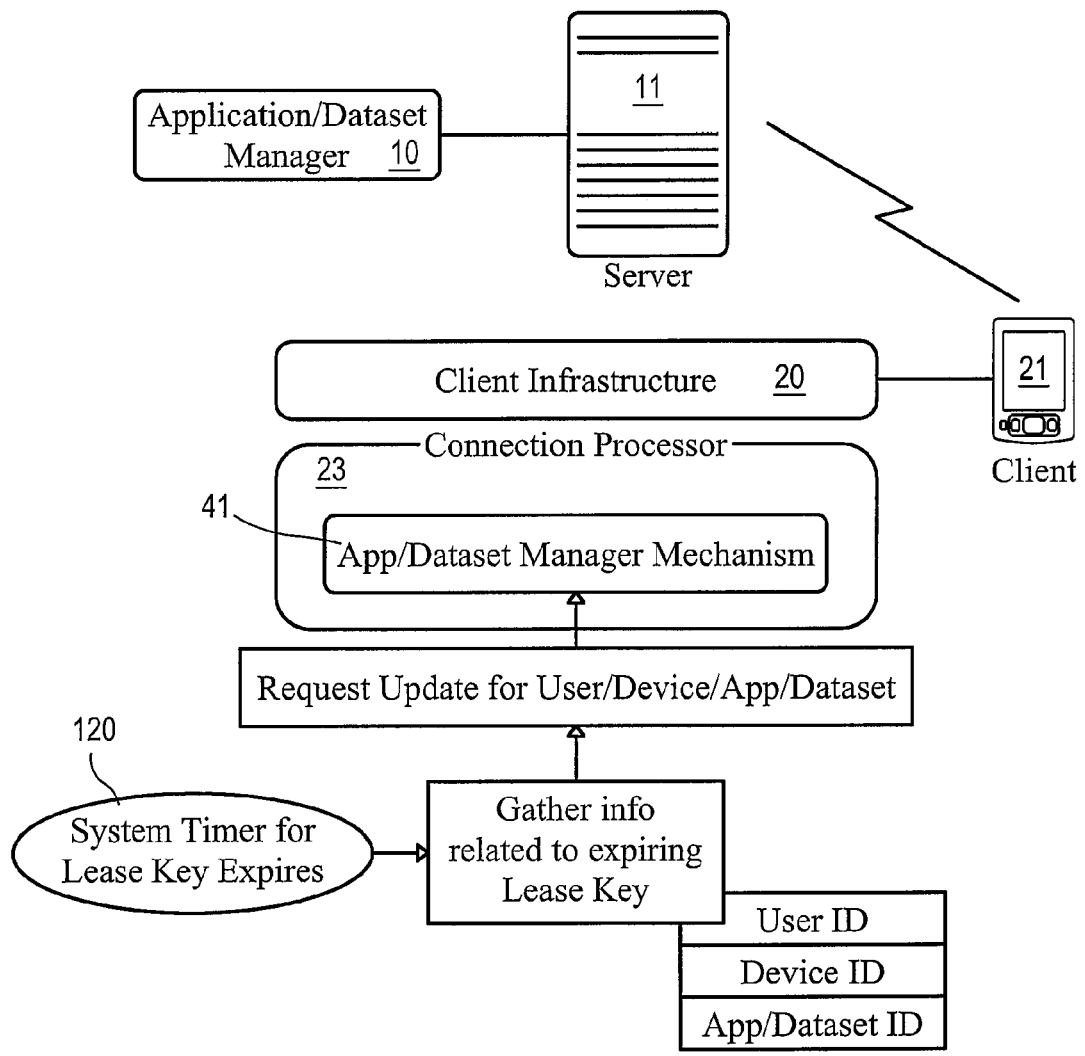
FIG. 12 is an illustration of the functionality of a Lease Key Expiration Event.

It was previously described that a system timer (established when the lease key was created) fires when its associated lease key expires. Prior to that event, access to the application/dataset protected by the lease key will have been authorized for the given user/device for a specific duration (e.g., one week) or until a specific time/date. When the lease key expires, as illustrated in FIG. 12, the system is designed to prevent further access to the protected application 30 or dataset 31 by the user/device until access can be re-authorized by the server 11. The objective is that the user's perception of this process is as transparent as possible; ideally seen only as a slight delay while the connection processor 23 checks the status to see if the lease key can be renewed. In alternative embodiments, the user may also need to provide authentication credentials (e.g., user name and password) to the connection processor 23 in order to properly establish the connection to the server 11.

When a system timer is fired 120 due to the expiration of a lease key, the system runs the program that was defined as the callback (the 'lease key expiration activity') when the timer was established. This callback is actually a call to the Connection Processor 23 requesting the access status of the application/dataset whose lease key is expiring for the given user/device. This is an example of a call to the Application/Dataset Manager 41 requesting a partial enumeration. The partial enumeration requested retrieves the current access status of the application/dataset whose timer has fired for the given user/device. The action performed by this call to the Connection Processor 23 is exactly as described earlier and summarized here (with the simplifying assumption that a newer version of the application/dataset has not been reported by the server).

If the access status is 'accessible,' a new lease key 61 is created (in effect, renewing the lease on the access to the application/device). Since the successful return code indicates that access was granted, the application/dataset remains accessible on the client device 21 (as it was before the lease key expired). If the access status is 'inaccessible' or if a connection can't be successfully established, the existing lease key is deleted (since it has expired) and no new lease key is created in its place. The status of the application/dataset in the enumeration is also updated to reflect the 'inaccessible' status. The result of these actions is that the application/dataset is deleted, locked, or left intact (depending on the action specified by the connection processor return code). Since access to the application/dataset is no longer granted, future access to application/dataset will be denied.

As indicated previously, the present invention operates as unobtrusively as possible to the user. Making security as 'automatic' as possible is a key method for improving the effectiveness of any security measures. Getting users to accept a new security measure is easier if the users reap the benefits without having to take extra steps and without needing additional training on a new method. Therefore, it is desirable to require a minimal amount of user interaction and to be as transparent to the user as possible. Thus, in an embodiment of the invention, new lease keys are generated each time the user logs into the system for applications and datasets that have been granted new lease key duration values by the application/dataset manager. This lease key self-renewal minimizes the number of times a user will have to be interrupted because of an expired lease key. For example, if a district manager typically downloads new data every day, the a lease key duration of 24 or 25 hours would, in most cases, result in a new key being created on the mobile device just before the previous day's key would expire. As a result, the district manager would rarely need to take action just to renew the key. It also would leave the device's data exposed to any potential unauthorized access for only a day.

As set out above, this renewal process will occur each time a user logs into the system; however, in alternate embodiments of the invention designed to be used on client devices that do not have explicit user associations that come from logging in to such a device (e.g, cell phones), the renewal may occur at any natural points in the use of the device that give the opportunity for user authentication, such as logging in to receive voicemail.

In the normal operation of the present invention, that the entity that 'owns' the data also can and should control the authorized access to the data. Security of corporate data needs corporate control, while security of personal data needs personal control. Therefore, it is important that the security of corporate data deployed on mobile devices be controlled by the appropriate corporate staff (typically implemented with server-based security tools administered by the IT staff), who would specify the permissions and privileges of each user to each application or dataset, as well as specifying the amount of time access is allowed. A corporate data policy may require that some data on a device becomes inaccessible even when there is no reason to make the entire device become inaccessible. For example, an enterprise may want the details of last week's 'per store' data to expire at the beginning of a new week unless and until that data is re-requested by a user.

In alternate embodiments of the invention, a corporate deployment of the invention is tied into the same user authentication mechanism as used to log into a corporate server in order to avoid duplication of effort. Also, leveraging existing data delivery mechanisms that put the data onto the mobile devices is beneficial since it would allow the product to be deployed on a number of existing mobile networks (e.g., BlackBerry, Verizon, etc.), rather than requiring the creation and maintenance of an entirely new network. In this situation, the present invention would deliver the data in an already secure state.

It is also important that the security of personal data can be controlled by the user. The 'personal' nature of PDAs and PIMs recognize that today's mobile devices are used for a convergence of personal business as well as corporate business. Some of this data is intermixed (e.g., an address book may contain personal and corporate names, addresses, and phone numbers). The intermixed data may be protected, in alternate embodiments of the invention, either by enforcing the most restrictive policy for datasets that have multiple security policies defined, or implementing record-level security for such datasets. In an embodiment of the invention where a user may elect to further-restrict corporate applications or datasets that are already restricted, the most restrictive access rights will apply.

In an embodiment of the present invention there is a 'personal management console'. This personal management console gives the individual user the ability to specify access restrictions to personal data on the device. For example, a personal spreadsheet—whether being used for business or personal purposes—that was not pushed to the device by an application using the corporate mechanisms for mobile data security could have its access controlled by the individual user. In an embodiment of the invention, the access restrictions to personal data may include a local (on the mobile device) strong password/key and a local application that would re-authorize the access based on that strong password/key. This type of implementation would be able to leverage hardware-based security mechanisms found in some advanced devices (where the hardware is used to protect the key/password). In alternate embodiments of the invention, this personal management console could run on a desktop computer, on the client device, or could be a web-based application that uses the mobile device's online capabilities to manage the mobile device's information. Alternatively, the personal management console could run on more than one environment.

In another embodiment of the invention, the personal management console's actions integrate with the corporate management console, with access to the personal console being integrated with the existing backend authentication of the corporate console. Thus, the personal console would allow personal information to be managed via the same mechanism as his/her corporate information. This will allow a local user to mark personal information as 'managed' by a desktop. Optionally, a copy of the information may be uploaded to the server (for safekeeping). This is useful for corporate information (such as ad hoc spreadsheets) that is not currently under corporate control, but would probably not be necessary for personal information with no connection to business activities.

In another embodiment of the invention, an application programming interface (API) is installed on the mobile device to encrypt all data leaving the device. This implementation would provide data security to all exported data regardless of device type. This would also eliminate the possibility that a sophisticated user could export data to a desktop in an insecure form and then move the data to the mobile device without securing it.

In an embodiment of the invention, data secured by the present invention may be stored in encrypted form on the device until the lease key has been validated. However, this embodiment has the consequence that the data must be decrypted every time the data is accessed. This decryption process, although very secure, may slow down data access on the mobile device. In an alternate embodiment, the data is not encrypted, but is hidden or secured by other means.

In other embodiments, different security mechanisms may be implemented. As noted above, a secure wrapper mechanism may be used to secure data on the mobile device. For example, existing technology such as that found in archiving programs such as WinZip can deploy files as 'self-extracting' archives that can require a password for decompressing the contents. The technology is relevant in two areas: (1) it demonstrates that the contents of a file can be wrapped in a mechanism that can invoke a program upon an attempt to open the file; and (2) the actual contents of the encapsulated data can be encrypted such that the de-compression program that is invoked by the wrapper can have sufficient processing to determine whether a provided password is authorized to unlock the encryption.

The present invention is able to provide support for multiple devices, device types, data stores, and operating systems. The number and types of mobile devices that store corporate data is expanding and includes today's laptop/tablet computers, PDA/PIM devices, cell phones, and 'convergence' devices that encapsulate functionality from a number of today's device types. Corporate IT departments often need to manage mobile data security on devices running Windows, Palm OS, BlackBerry's OS, Symbian, and BREW devices. Each of these device platforms have different storage management approaches (file systems, file/memory 'heaps', etc.), different native access controls, etc.

The present invention incorporates a unified security mechanism for multiple platforms and is designed such that emerging platforms can be accommodated readily and deployed on an as-needed basis. The present invention also provides security that is specified at the data level, rather than at the device level. Rather than locking down the entire device's contents by a common set of security decisions, the present invention provides multiple data security policies that will be applied in accordance with the security level deemed appropriate for the data.

Although details of specific implementations and embodiments are described above, such details are exemplary of the invention rather than limiting the scope of the following claims. Many changes may be made by persons of ordinary skill in the art in the details of construction and the arrangement of components, and such changes do not depart from the spirit and scope of the invention. The invention is defined by the claims, rather than being limited by the specific features described above.

What is claimed is:

1. A method for providing mobile data security, comprising:
    transmitting to a client device a connection processor tool for allowing said client device to connect to a server;
    establishing a connection with the client device and authenticating the connection;
    transmitting to said client device an enumeration of one or more data files or an enumeration of one or more applications;
    transmitting to said client device a lease key management tool to allow said client device to create a lease key using client side information and the lease key is stored in the client device's enumeration of configuration data for an application and/or a dataset stored on the client device to control access to the application and/or dataset
    if said enumeration of one or more applications lists an application new to said client device, receiving a request for retrieval of said new application
    wherein said request for a new application or data file comprises a request for partial enumerations of applications or data files;
    if said enumeration of one or more data files lists a data file new to said client device, receiving a request for retrieval of said new data file, and
    transmitting to said client device the new application or the new data file in a format corresponding to said client device.

2. The method of claim 1, wherein the step of transmitting the new application to said client device includes transmitting a partial enumeration of one or more applications including a specific application identified in said request for a new application.

3. The method of claim 1, wherein the step of transmitting the new data file to said client device includes transmitting a partial enumeration of one or more data files including a specific data file identified in said request for a new data file.

4. The method of claim 1, where the created lease key has an expiration time for each data file or application residing in the client device; and further comprising the step of:
    transmitting to said client device an instruction for maintaining the lease key in the client device.

5. The method of claim 4, further comprising the step of:
    upon expiration of said lease key, transmitting to said client device a re-authorization to access a file or application associated with said lease key.

6. The method of claim 1, further comprising the step of transmitting to said client device an instruction for storing said retrieved application or data file in a specific location in said client device.

7. A method for providing mobile data security, comprising:
    receiving a connection processor tool for allowing a client device to connect to a server;
    authenticating a connection from said client device to said server;
    receiving by said client device a lease key management tool to allow said client device to create a lease key using client side information and the lease key is stored in the client device's enumeration of configuration data for an application and/or a dataset stored on the client device to control access to the application and/or data set;
    receiving an enumeration of one or more data files or an enumeration of one or more applications;
    processing said enumeration of data files or enumeration of applications;
    if said enumeration of applications lists an application new to said client device, transmitting a request for retrieval of said new application;
    if said enumeration of data files lists a data file new to said client device, transmitting a request for retrieval of said new data file; and
    receiving said new application or data file in a format corresponding to said client device.

8. The method of claim 7, wherein receiving said new application includes receiving partial enumeration of one or more applications including a specific application identified in said request for retrieval of said new application.

9. The method of claim 7, wherein receiving said new data file includes receiving partial enumeration of said data files including a specific data file identified in said request for retrieval of said new data file.

10. The method of claim 7, wherein said requests for retrieval comprise one or more requests for partial enumerations of applications or data files.

11. The method of claim 7, where the created lease key has an expiration time for each data file or application residing in the client device; and further comprising the step of:
receiving an instruction for maintaining each said lease key in the client device.

12. The method of claim 11, further comprising:
upon expiration of a first lease key, requesting said server for re-authorization to access a file or application associated with said first lease key.

13. The method of claim 7, further comprising the step of receiving an instruction for storing said retrieved application or data file in a specific location in said client device.

14. The method of claim 7, wherein the step of processing enumeration of data files or enumeration of applications comprises:
if a same version of a data file or a same version of an application listed in the enumeration already exists in said client device, creating a lease key for the existing application or data file.

15. The method of 7, wherein the step of processing said enumeration of data files or enumeration of applications comprises:
if an earlier version of a data file or an earlier version of an application listed in the enumeration exists in said client device, transmitting a request for an update of a data file or an application; and
if an update of an application or data file is successfully received, creating a new lease key for the application or data file updated.

16. The method of claim 15, further comprising:
upon expiration of the new lease key, requesting said server for re-authorization to access a file or application associated with said lease key.

* * * * *